May 7, 1963
J. J. NEUMAYER
3,088,319
APPARATUS FOR DETERMINING MOLECULAR WEIGHT
Filed Aug. 20, 1959
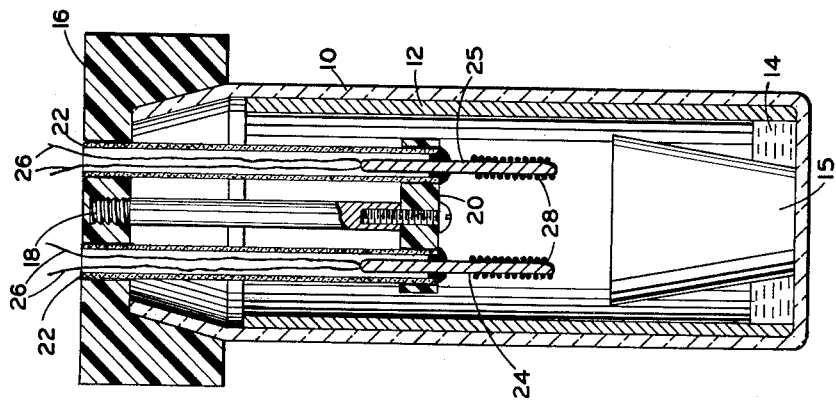
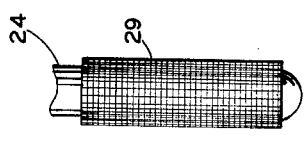
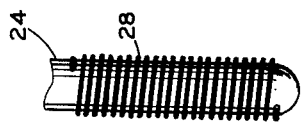
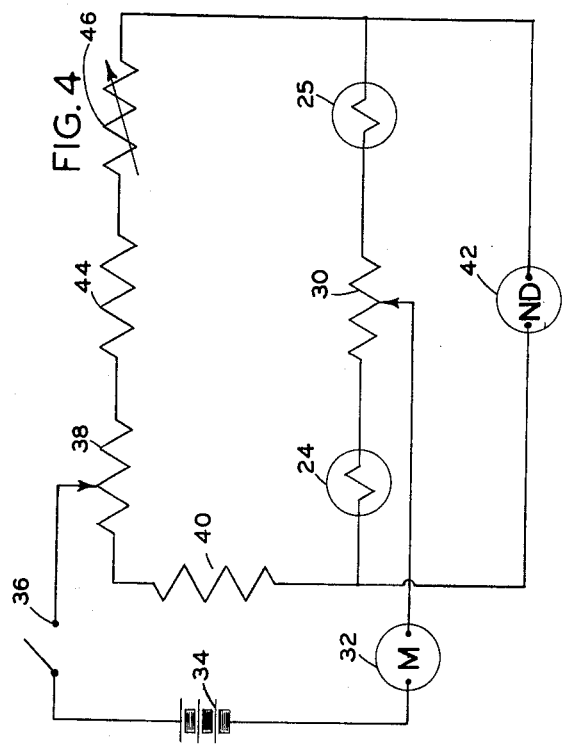
INVENTOR.
JOHN J. NEUMAYER
BY
Frank A. Steter
ATTORNEY

United States Patent Office 3,088,319
Patented May 7, 1963

3,088,319
APPARATUS FOR DETERMINING MOLECULAR WEIGHT
John J. Neumayer, St. Paul, Minn., assignor to Minnesota Mining and Manufacturing Company, St. Paul, Minn., a corporation of Delaware
Filed Aug. 20, 1959, Ser. No. 835,131
4 Claims. (Cl. 73—342)

This invention relates to scientific apparatus and more particularly to an apparatus for the determination of molecular weight of chemical compounds.

It is known that the molecular weight of organic chemical compounds can be determined by preparing a solution of a known quantity of a compound in a known amount of a solvent and measuring the effect of the dissolved material upon the vapor pressure of the solvent. This is accomplished by determining the difference in equilibrium temperature between an amount of solvent and an amount of the solution when these are exposed to an atmosphere saturated with solvent vapors. An apparatus for this purpose has been described by Müller and Stolten in Analytical Chemistry, vol. 25, p. 1103, 1953. In that report, an apparatus is shown which employs temperature-sensitive resistors (thermistors) for measurement of the temperature difference between solvent and solution in an atmosphere saturated with the solvent vapors. While that device is useful for the purposes of determinnig molecular weights, certain disadvantages exist in connection with its use. The construction heretofore known has been characterized by requiring a relatively long time, of the order of 30 minutes or more, to reach a state of equilibrium before the difference in temperatures can be measured. Furthermore, because cups of considerable volume are employed for holding the solution to be tested, a relatively large amount of material is necessary for making the determination of molecular weight. The instrument heretofore known also requires the use of mercury as a heat transfer means to bring the receptacles for solvent and solution to a constant predetermined temperature.

As the temperature change involved in determination of molecular weight by this method is of the order of one- to two-tenths of a degree centigrade, it is apparent that high sensitivity and reproducibility of results are of prime importance.

In a similar instrument heretofore used for determining vapor pressure, aqueous solutions have been employed, which have been applied to thermistors in the form of a drop which clings to the lower end of the thermistor. Such expedients fail to affect the temperature of more than a part of the sensing element and consequently are relatively insensitive, particularly when organic solvents are employed.

It is an object of the present invention to provide an apparatus for the determination of the molecular weight of chemical compounds by measurement of certain differential temperatures which requires only a small amount of material of which the molecular weight is to be determined. Another object of the invention is to provide a sensitive and convenient apparatus which permits very rapid determination of molecular weights by the aforesaid method. A still further object of the invention is to provide an apparatus which dispenses with the use of mercury. Other objects will be apparent from the disclosures hereinafter made.

In accordance with the above and other objects, it has been discovered that when an apparatus of the class described is provided with a means of small mass associated with the temperature sensing devices, which means is adapted to retain a film of liquid in contact with the said temperature sensing element by means of surface tension forces, i.e., capillarity, while also exposing the film to the solvent vapors employed, very advantageous results are accomplished. The resulting device while very much more rapid in reaching a state of temperature stability, gives results which are fully as accurate as the device using much larger amounts of solvent and solution. Furthermore, since only very small amounts of solution are required, it is possible to determine the molecular weight of a chemical compound using very small quantities of material. As the determination requires a much shorter time, less strict control of temperature is required and the electronic circuit used need not be stable for long periods of time. The machine is also more sensitive than that heretofore known.

The apparatus of the present invention will be described more particularly with reference to the accompanying drawing, in which FIGURE 1 is an elevation partly in cross-section of the apparatus on a diameter thereof which bisects the temperature sensing devices along their longitudinal axes. FIGURE 2 is an enlarged representation of an elevation of the liquid retaining means, in place on the temperature-sensitive portion of a thermistor. FIGURE 3 is a side view of another embodiment of the liquid retaining means, in position on the temperature-sensitive portion of a thermistor. FIGURE 4 is a shematic circuit diagram of a typical electronic circuit used in conjunction with the temperature sensitive measuring means in the present invention.

Referring to the drawings, in FIGURE 1, 10 represents a cylindrical solvent vapor chamber, conveniently made of glass; 12 is an absorbent paper liner for the chamber, which is in contact with the wall of the container but need not be held thereto by means other than by its own resilience, 14 is a solvent employed in the determination of the molecular weight involved, and 15 is a generally cylindrical receptacle for collecting solution rinsings. The container 10 is closed by a cap 16, conveniently made of synthetic resin or the like, bearing a support rod 18 suitably attached thereto at one end and carrying a supporting plate 20 made of solvent resistant material (which may also be electrically insulating) at the other. Inserted through axially holes in the cap 16 and in the supporting plate 20, and held therein as by frictional engagement, are tubular thermistor holders 22 which bear identical generally rod-shaped thermistors 24 and 25 fixed (as by a solvent resistant cement) in the lower ends thereof and having insulated wire electrical connections 26 extending through the tube and connecting with an electrical measuring circuit. Thermistors 24 and 25 have affixed upon their lower ends identical helical wire liquid-retaining means 28 covering the entire temperature-sensing portion of the thermistor and conveniently held thereupon mechanically by frictional engagement.

Referring to FIGURE 2, there is shown in elevation and to somewhat larger scale the temperature-sensitive portion of a thermistor 24, bearing liquid retaining means conveniently held in frictional engagement on its surface and consisting of a helical metal wire coil 28 of dimensions originally slightly smaller than that of the thermistor, so that when forced over the end thereof it will be firmly held thereon. The distance between adjacent turns is exaggerated for clarity of representation. The individual turns of the coil are closely spaced but need not be in contact, although the conduction of heat to the thermistor by the metal permits the use of helical coils, the turns of which are in contact.

In FIGURE 3, another embodiment of the liquid retaining means is shown, consisting of a woven wire screen 29 contacting the surface of the temperature-sensitive portion of a thermistor 24. The wire screen is shown schematically.

The liquid (solvent or solution) employed is held in contact with the thermistor in a thin film on the surfaces of and between spaced-apart wires of the retaining means because of surface tension forces, or capillarity. At the same time, the wire screen or coil appears to facilitate heat transfer by increasing the available heat transfer area of the thermistor.

Referring to FIGURE 4, there is shown a schematic diagram of the electronic circuit employed for measuring the temperature difference between thermistor 24 and thermistor 25. Thermistors 24 and 25 are shown connected by one lead from each through the opposite ends of a 20 ohm wire wound potentiometer 30. The center variable tap from potentiometer 30 is connected through a zero to 50 microammeter 32 to one terminal of a 4.5 volt battery 34. The other terminal of battery 34 is connected through switch 36 to the variable center tap of a 1,000 ohm wirewound potentiometer 38. One end of said potentiometer 38 is connected through a 100,000 ohm fixed wire-wound resistor 40 to the other lead of thermistor 24, and from thence to null detector 42. The other terminal of potentiometer 38 is connected through a 100,000 ohm fixed wire-wound resistor 44 and 1000 ohm ten-turn wire-wound variable resistor 46 to the other terminal of thermistor 25 and thence to null detector 42. The operation of the electronic circuit is that of a Wheatstone bridge, to determine the variation in resistance of the thermistors, which of course is dependent on their temperature.

Two thermistors are employed of substantially identical characteristics, so as to negative the effect of slight changes in conditions. However, it will be apparent that under suitable conditions of operation one thermistor alone used in conjunction with a fixed resistance of suitable resistance value in the bridge circuit in place of one of the thermistors could produce useful results.

In operation, the cylindrical container 10 is immersed in a constant temperature water bath thermostated at about 30° C. plus or minus 0.01°, up to a point just below cap 16. A sufficient amount of the selected solvent is placed in the vapor chamber to provide a depth of about 1 cm. of solvent in the bottom of the chamber in excess of that required to saturate absorbent paper lining 12. An opening (not shown) in cap 16 at a point adjacent to support rod 18 facilitates this operation, although it can also be accomplished by removal of the cap and its attached apparatus. The wire helices 28 covering thermistors 24 and 25 are then covered with about 0.1 ml. of the selected solvent, which may also be conveniently placed upon the coils by inserting a pipette of small diameter containing the liquid through the said opening (not shown) in cap 16. The solvent introduced into the chamber and onto the thermistors is provided at the temperature 30° C. by employing solvent which has been kept in a separate container in the same constant temperature bath as heretofore mentioned. Variable resistance 46, which is provided with a geared indicator dial and vernier calibrated to read from zero to 1000 ohms in 1 ohm steps, is set at zero resistance and switch 36 is closed. Microammeter 32 serves to show that current is flowing and that the circuits are operative, but has no other function and may be dispensed with if desired. When temperature equilibrium has been established with the vapor chamber, as shown by a stable reading on the null detector, the bridge circuit is balanced at the null point by adjusting potentiometers 30 and 38. The solvent in contact with the sensing thermistor 24 is then rinsed off and replaced with about 0.1 to about 0.2 ml. of a solution containing a small mole fraction, say about 0.005 to 0.01 mole fraction, of the compound of which the molecular weight is to be determined in the selected solvent. Before use, the solution is brought to 30° C. by immersion of its container in the constant temperature bath. (The mole fraction as defined herein is the value determined by substituting the quantities used in the following formula:

$$\frac{\text{Moles solute}}{\text{Moles solvent} + \text{moles solute}}$$

The rinsings and any excess of solution fall into the receptacle 15. The exact amount of solution which remains upon the liquid retaining means attached to the thermistor is not critical. After about 3 minutes, as shown by a constant reading on the null detector, the sensing thermistor has reached its maximum temperature, and consequently its maximum resistance. The bridge circuit is again balanced using variable resistor 46. The increase in the resistance of the thermistor in ohms, as read upon the calibrated dial of resistor 46, is recorded. The change in resistance of the thermistor 24 is related to the increase in temperature brought about in the solution by condensation of solvent vapor on the solution, whereas there is no increase in temperature in the solvent alone on the thermistor 25, which is in contact with the solvent vapor. The change in resistance of the thermistor 24 varies directly and proportionally to the change in temperature. The change in resistance thus determined, when substituted into the following formula, gives the molecular weight of the solute:

$$MW_x = \frac{g \cdot MW_s (K - \Delta R)}{\Delta R \cdot gs}$$

wherein $MW_x$ is the molecular weight of the solute, $MW_s$ is the molecular weight of the solvent, $g$ is the weight in grams of solute, $K$ is a proportionality constant, $\Delta R$ is the change in resistance of the thermistor, and $gs$ is the weight in grams of solvent used. The weights of solvent and solute are recorded in preparing the solution, or, if only the mole fraction is known, the weight of solute can be determined for a convenient weight, say 10 grams, of solvent. The proportionality constant is determined for each solvent as follows: using a chemical compound of known molecular weight, a solution containing a known amount (mole fraction) of the compound is prepared, of the order of 0.05 to about 0.01. A determination is made of the change in resistance $\Delta R$ using the present apparatus. This change in resistance in ohms, the weight of solute and solvent, and the respective molecular weights of solute and solvent are substituted into the above formula. In this way, $K$ is calculated for each solvent which is to be employed.

The helical wire means shown in FIGURE 2 and the wire screen means in FIGURE 3 are conveniently made of platinum wire, so as to avoid any possibility of corrosion through use with particular solvents or chemical compounds. However, other metals will of course also be suitable under many conditions. Likewise, other embodiments of this means, such as closely adjacent wire rings or loops, a very thin layer of metallic sponge, closely spaced grooves or ridges in the thermistor itself, or the like means which retains a film of liquid in contact with the temperature sensing means while permitting exposure of the liquid to the solvent-saturated atmosphere in the container will also be suitable for the purposes of the invention.

The following table illustrates the results obtained by use of the apparatus of the invention in determining the molecular weights of known compounds. In determining these values, the method set forth above was used.

| Compound tested | ΔR, ohms | Mole fraction | Molecular Weight | | Solvent |
|---|---|---|---|---|---|
| | | | theoretical | found | |
| Naphthalene | 779 | 0.00728 | 128 | 129 | Chloroform K=107,900. |
| 1,2,4,5-tetrachlorobenzene. | 545 | 0.00505 | 216 | 216 | |
| Dibenzyl | 684 | 0.00632 | 182 | 182 | |
| Coumarin | 825 | 0.00761 | 145 | 146 | |
| Coumarin | 855 | 0.01063 | 146 | 146 | Ethyl acetate K=80,400. |

What is claimed is:

1. In an apparatus for determining molecular weight of a solute by determination of the difference in equilibrium temperature between solvent and solution in an atmosphere saturated with solvent vapor, a temperature sensing means bearing non-solvent-absorbent means of high thermal conductivity in contact with, coextensive with and encircling the temperature-sensitive portion of said temperature-sensing means utilizing surface tension for retaining a substantially continuous film of liquid in contact therewith and exposed to said solvent vapors.

2. In an apparatus for determining molecular weight of a solute by determination of the difference in equilibrium temperature between solvent and solution in an atmosphere saturated with solvent vapors, in combination, a solvent-temperature sensing means bearing non-solvent-absorbent means of high thermal conductivity coextensive with and encircling the temperature-sensitive portion thereof and in close contact therewith for retaining a substantially continuous film of liquid in contact therewith by surface tension and exposed to said solvent vapors; a solution-temperature sensing means bearing non-solvent-absorbent means of high thermal conductivity coextensive with and encircling the temperature-sensitive portion thereof and in close contact therewith for retaining a substantially continuous film of liquid in contact therewith and exposed to said solvent vapors; and means associated with the said temperature sensing means for determining the temperature of each of said means.

3. In an apparatus for determining molecular weight of a solute by determination of the difference in equilibrium temperature between solvent and solution in an atmosphere saturated with solvent vapors, in combination, a thermistor and associated therewith a helical wire coil coextensive with and encircling the temperature-sensitive portion of said thermistor for retaining, by surface tension, a film of liquid in contact with the said thermistor and exposed to the said solvent vapors.

4. In an apparatus for determining molecular weight of a solute by determination of the difference in equilibrium temperature between solvent and solution in an atmosphere saturated with solvent vapors, in combination, a solvent temperature sensing thermistor and associated therewith a helical wire coil coextensive with and encircling the temperature-sensitive portion of said thermistor for retaining, by surface tension, a film of liquid in contact with the thermistor and exposed to the solvent vapors; a solution temperature sensing thermistor having associated therewith a helical wire coil coextensive therewith and encircling the temperature-sensitive portion of said thermistor for retaining, by surface tension, a film of liquid in contact with the said thermistor and exposed to solvent vapors; and means associated with the said thermistors for determining the temperature of each of said thermistors.

References Cited in the file of this patent

UNITED STATES PATENTS

| 2,170,193 | Godsey | Aug. 22, 1939 |
| 2,494,628 | Oberding | Jan. 11, 1950 |
| 2,603,972 | Kahn | July 22, 1952 |
| 2,638,783 | Rittner et al. | May 19, 1953 |

FOREIGN PATENTS

| 359,718 | Germany | Sept. 26, 1922 |

OTHER REFERENCES

Hill, A. V.: Proceedings of the Royal Society of London, series A, vol. 127, pages 9–19 (April 1, 1930).

Muller and Stolten: Analytical Chemistry, vol. 25, pages 1103–1106 (July 1953). Copies of the above in the Scientific Library, U.S. Patent Office.